United States Patent
Wu

(10) Patent No.: US 8,289,551 B2
(45) Date of Patent: Oct. 16, 2012

(54) APPROACH FOR PROCESSING PRINT DATA WITHOUT A CLIENT PRINT DRIVER

(75) Inventor: Yuwen Wu, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 597 days.

(21) Appl. No.: 12/534,749

(22) Filed: Aug. 3, 2009

(65) Prior Publication Data

US 2011/0026073 A1 Feb. 3, 2011

(51) Int. Cl.
*G06F 15/00* (2006.01)
*G06F 3/12* (2006.01)
*G06K 1/00* (2006.01)

(52) U.S. Cl. .......................... 358/1.15; 358/1.9

(58) Field of Classification Search .................. None
See application file for complete search history.

(56) References Cited

U.S. PATENT DOCUMENTS

| | | | |
|---|---|---|---|
| 5,467,434 A | 11/1995 | Hower et al. | |
| 5,513,126 A | 4/1996 | Harkins et al. | |
| 5,768,483 A | 6/1998 | Maniwa et al. | |
| 5,845,076 A | 12/1998 | Arakawa | |
| 5,875,350 A | 2/1999 | Comp et al. | |
| 5,996,029 A | 11/1999 | Sugiyama et al. | |
| 5,999,945 A | 12/1999 | Lahey et al. | |
| 6,789,111 B1 | 9/2004 | Brockway et al. | |
| 7,880,923 B2 * | 2/2011 | Kato | 358/1.4 |
| 7,999,951 B2 * | 8/2011 | Ferlitsch | 358/1.13 |
| 2001/0050684 A1 | 12/2001 | Smith | |
| 2002/0030840 A1 | 3/2002 | Itaki et al. | |
| 2002/0054339 A1 | 5/2002 | Arakawa | |
| 2002/0171857 A1 | 11/2002 | Hisatomi et al. | |
| 2002/0174444 A1 | 11/2002 | Gatto et al. | |
| 2003/0033368 A1 | 2/2003 | Tominaga | |
| 2003/0184782 A1 | 10/2003 | Perkins et al. | |

(Continued)

FOREIGN PATENT DOCUMENTS

| | | | |
|---|---|---|---|
| JP | 2005148953 A | | 6/2005 |
| WO | WO 2004/070607 A1 | | 8/2004 |

OTHER PUBLICATIONS

European Patent Office, "European Search Report", application No. EP 07250298, dated Feb. 23, 2010, 8 pages.

*Primary Examiner* — Douglas Tran
(74) *Attorney, Agent, or Firm* — Hickman Palermo Truong Becker Bingham Wong LLP; Edward A. Becker

(57) ABSTRACT

An approach is provided for processing print data without a client print driver. A print agent is configured to discover a conversion service using Web services. A Web services-enabled print service is configured to determine whether print data received from a client is rasterized. In response to determining that the print data is not rasterized, the print service is further configured to transmit the print data to the print agent. The print agent is further configured to receive the print data from the print service and transmit the print data to the conversion service. The print agent is further configured to receive the print data as rasterized print data from the conversion service, and transmit the rasterized print data to the print service. The print service is further configured to receive the print data as rasterized print data from the print agent, and process the rasterized print data for printing.

20 Claims, 7 Drawing Sheets

U.S. PATENT DOCUMENTS

| | | |
|---|---|---|
| 2004/0179231 A1 | 9/2004 | Savino et al. |
| 2005/0046886 A1 | 3/2005 | Ferlitsch |
| 2005/0099650 A1 | 5/2005 | Brown et al. |
| 2005/0213136 A1 | 9/2005 | Noyama et al. |
| 2005/0223390 A1 | 10/2005 | Moore |
| 2007/0002368 A1 | 1/2007 | Corona |
| 2007/0086023 A1 | 4/2007 | Kadota |
| 2007/0263242 A1 | 11/2007 | Takahashi |
| 2008/0231886 A1 | 9/2008 | Wehner et al. |
| 2010/0225957 A1 | 9/2010 | Liu et al. |

\* cited by examiner

| Conversion Type | IP Address |
|---|---|
| text/plain | 172.30.4.223: 1600 |
| text/html | 172.30.4.223: 1600 |
| image/jpeg | 172.30.4.223: 1600 |
| image/bmp | 172.30.4.223: 1600 |
| text/plain | 172.30.4.160: 1600 |
| application/pdf | 172.30.4.160: 1600 |
| application/msword | 172.30.4.160: 1600 |

402 — text/plain
404 — text/html
406 — image/jpeg
408 — image/bmp
410 — text/plain
412 — application/pdf
414 — application/msword

APPROACH FOR PROCESSING PRINT DATA WITHOUT A CLIENT PRINT DRIVER

FIELD OF THE INVENTION

The present invention relates to using Web services to process print data at a printing device without a client print driver, and more specifically, to discovering, at a client, printing devices that support non-print driver printing and discovering conversion services, at a printing device, for converting non-rasterized print data, using Web services.

BACKGROUND

When a user requests that an electronic document, generated by an application program, be processed for printing, a print subsystem on the user's client device processes the electronic document to generate print data. The print data generated by the subsystem, which is a rasterized version of the electronic document, is then sent to a printing device for printing. This rasterized print data includes all of the information required by the printing device to print the electronic document reflected in the print data.

For example, a user creates an electronic document using a word processing application on a PC. The user then selects a print option in the word processing application to request that the electronic document be printed at a particular printer. The print subsystem on the PC processes the electronic document to generate rasterized print data in a format supported by the particular printer, and sends the rasterized print data to the particular printer.

Generating print data conventionally involves a client print driver that is specific to the target printing device. That is, a client print driver converts data into a format supported by the target printing device. Therefore, in order for a client device to correctly print to a particular printing device using this conventional print driver system, the client device must have installed on it a current print driver for the particular printing device.

Locating and installing client print drivers can be difficult and time-consuming. Furthermore, if the capabilities of a printing device changes, then generating a new client print driver and distributing the new client print driver to a large number of users having an outdated version of the client print driver may be required. Also, print drivers are not always available for all operating systems.

Using another conventional system, a client machine that does not have a client print driver corresponding to a particular printing device may print to the printing device if the device is associated with a dedicated print server. The client may transmit print data to the dedicated print server, which formats the print data for the target printing device and forwards the formatted print data to the target device. However, in order to print through such a dedicated server, the client must know the IP address of the server. Also, the options and capabilities of the available print devices may not be accessible by a client that is printing through a dedicated server. Therefore, the client using the dedicated server may not be able to take full advantage of the features provided by the printing devices.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

An approach is provided for processing print data at a printing device without a client print driver. The printing device includes a Web services-enabled print service and a print agent. The print agent is configured to discover a particular conversion service using Web services. The Web services-enabled print service is configured to receive print data from a client and determine whether the print data is rasterized. In response to determining that the print data is not rasterized, the Web services-enabled print service is further configured to transmit the print data to the print agent.

The print agent is further configured to receive the non-rasterized print data from the Web services-enabled print service and transmit the print data to the particular conversion service discovered using Web services. The print agent receives the print data as rasterized print data from the particular conversion service, and transmits the rasterized print data to the Web services-enabled print service. The Web services-enabled print service receives the print data as rasterized print data from the print agent and processes the rasterized print data for printing.

Embodiments of the invention include the print agent being further configured to discover a plurality of conversion services, including the particular conversion service, and determine a conversion type supported by each of the plurality of conversion services. The print agent determines whether a type of the print data matches the conversion type of the particular conversion service, and in response to determining that the type of the print data matches the conversion type of the particular conversion service, transmits the print data to the particular conversion service. Embodiments of the invention further include the print agent being configured to maintain a table that includes an address of each of the plurality of conversion services and the conversion type for each of the plurality of conversion services.

Embodiments of the invention further include the Web services-enabled print service being configured to respond to discovery requests, from clients, that indicate that a non-print driver printing device should respond. In another aspect of the invention, the printing device comprises a Web services-enabled print service configured to receive print data from a client, and determine whether the print data is rasterized. In response to determining that the print data is not rasterized, the Web services-enabled print service transmits the print data to a print agent at the printing device, receives the print data as rasterized print data from the print agent, and processes the rasterized print data for printing. The printing device further comprises the print agent configured to discover a particular conversion service using Web services. The print agent is further configured to receive the print data from the Web services-enabled print service, wherein the print data is not rasterized, transmit the print data to the particular conversion service, receive the print data as rasterized print data from the particular conversion service, and transmit the rasterized print data to the Web services-enabled print service.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 illustrates a table of conversion services information.

DETAILED DESCRIPTION

Figure 1:
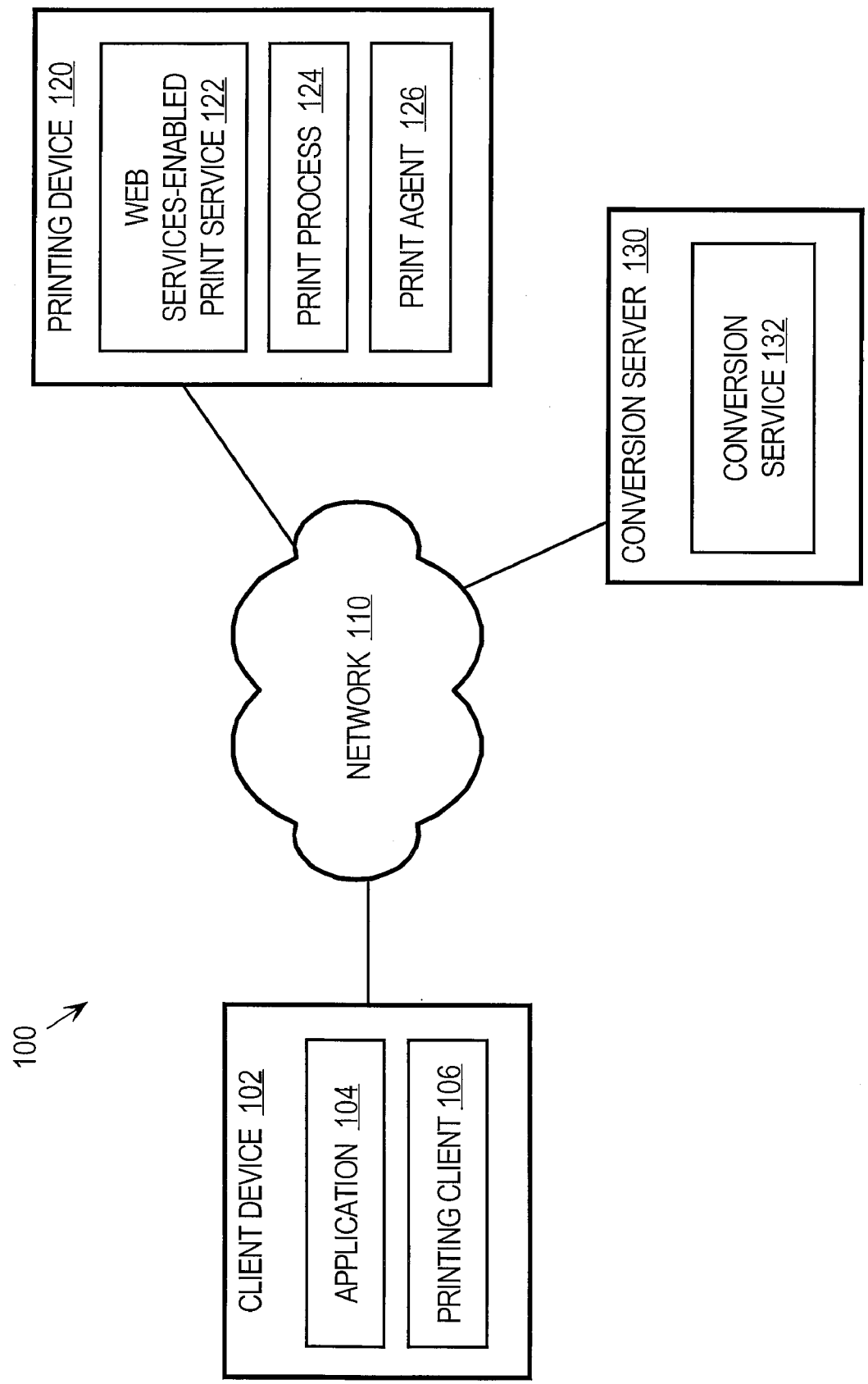
FIG. 1 is a block diagram that depicts an example network arrangement for processing print data without a client print driver.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. PRINTING ARCHITECTURE
III. PRINTING WITHOUT A CLIENT PRINT DRIVER
IV. WEB SERVICES
  A. WSD DEVICES
V. USING WEB SERVICES TO PROCESS NON-RASTERIZED PRINT DATA FROM A CLIENT
  A. DISCOVERING CONVERSION SERVICES
  B. DISCOVERING PRINTING DEVICES THAT SUPPORT NON-PRINT DRIVER PRINTING
  C. GRAPHICAL USER INTERFACE
  D. TRANSFERRING PRINT DATA AND OPTIONS TO A PRINTING DEVICE
  E. CONVERTING NON-RASTERIZED PRINT DATA USING A PRINT AGENT
VI. IMPLEMENTATION MECHANISMS

I. Overview

An approach is provided for processing print data at a printing device without a client print driver. The printing device includes a Web services-enabled print service and a print agent. The print agent is configured to discover a particular conversion service using Web services. The Web services-enabled print service is configured to receive print data from a client and determine whether the print data is rasterized. In response to determining that the print data is not rasterized, the Web services-enabled print service is further configured to transmit the print data to the print agent.

The print agent is further configured to receive the non-rasterized print data from the Web services-enabled print service and transmit the print data to the particular conversion service discovered using Web services. The print agent receives the print data as rasterized print data from the particular conversion service, and transmits the rasterized print data to the Web services-enabled print service. The Web services-enabled print service receives the print data as rasterized print data from the print agent and processes the rasterized print data for printing.

Embodiments of the invention include the print agent being further configured to discover a plurality of conversion services, including the particular conversion service, and determine a conversion type supported by each of the plurality of conversion services. The print agent determines whether a type of the print data matches the conversion type of the particular conversion service, and in response to determining that the type of the print data matches the conversion type of the particular conversion service, transmits the print data to the particular conversion service. Embodiments of the invention further include the print agent being configured to maintain a table that includes an address of each of the plurality of conversion services and the conversion type for each of the plurality of conversion services.

Embodiments of the invention further include the Web services-enabled print service being configured to respond to discovery requests, from clients, that indicate that a non-print driver printing device should respond.

A user with such a mobile client device, e.g., a laptop or a smart phone, may, for example, enter a new environment and process documents for printing without searching for and installing client print drivers. As another example, PCs or other non-mobile computers may be configured without print drivers using the embodiments of the inventions, thereby avoiding the need to update client print drivers as printer configurations change.

II. Printing Architecture

FIG. 1 is a block diagram that depicts an example network arrangement 100 for processing print data without a client print driver, according to an embodiment of the invention. Example network arrangement 100 includes a client device 102, a printing device 120, and a conversion server 130, communicatively coupled via a network 110.

Client device 102 may be implemented by any type of client device. Example implementations of client device 102 include, without limitation, workstations, personal computers, laptop computers, personal digital assistants (PDAs), cellular telephony devices, and any type of mobile devices. In example network arrangement 100, client device 102 is configured with an application 104 and a printing client 106. Application 104 may be any type of application process. Examples of application 104 include, without limitation, a word processor, a spreadsheet program, an email client, etc. As described in more detail below, printing client 106 is configured to provide a graphical user interface (GUI). Through such a GUI, a user may indicate that print data is to be sent to a particular printing device, i.e., printing device 120, and may specify the print settings selected for the print data. Thus, application 104 and printing client 106 operate together to provide print data to the selected printing device. In one embodiment of the invention, client device is configured without application 104.

Printing client 106 is further configured to communicate with printing devices, such as printing device 120, using Web services. In one embodiment of the invention, printing client 106 does not include rendering capabilities to convert non-rasterized print data to rasterized print data. For example, printing client 106 may be analogous to a print driver without a capability to generate rasterized print data. Client device 102 may be configured with other mechanisms, processes, and functionality, depending upon a particular implementation.

Printing device 120 may be implemented by any type of device that is capable of processing print data received from client device 102 and generating printed versions of electronic documents reflected in the print data. In example network arrangement 100, printing device 120 includes Web services-enabled print service 122, print process 124, and print agent 126. Printing device 120 may be configured with other mechanisms, processes and functionality, depending upon a particular implementation. The approach described herein for processing print data for printing without utilizing a client print driver is not limited to any particular type of printing device or network configuration. For example, printing device 120 may be a multi-function peripheral (MFP) that includes any combination of printing, copying, facsimile and scanning capability, etc. Any number of devices, including printing devices, client devices, and other devices, may be included in the network.

Web services-enabled print service 122 may be implemented by one or more processes for communicating with other applications and network devices using Web services, and for receiving print data from client device 102, as described in more detail below. Print process 124 may be implemented by one or more processes for processing print data received from client device 102, and for generating a printed version of an electronic document reflected in the print data. Print agent 126 may be implemented by one or more processes configured to discover and interact with conversion services, such as conversion service 132, as described in more detail hereinafter.

Web services-enabled print service 122, print process 124, and print agent 126 may be implemented as resident processes on printing device 120. Alternatively, one or more of Web services-enabled print service 122, print process 124, and print agent 126 may be made available to printing device 120 on a removable media or may be implemented at a remote location with respect to printing device 120. Also, Web services-enabled print service 122, print process 124, and print agent 126 may be implemented as plug-ins, or in hardware, software, or any combination of hardware or software, depending upon a particular implementation. Furthermore, according to one embodiment of the invention, printing client 106, Web services-enabled print service 122, print agent 126, and conversion service 132 implement one or more Web services protocols such as WS-Discovery, WS-Eventing, and WS-MetadataExchange, described in more detail below.

Conversion server 130 may be implemented by any type of device that is capable of communicating with printing device 120 over network 110. In example network arrangement 100, conversion server 130 includes conversion service 132, which converts non-rasterized print data to rasterized print data, as described in more detail below. Conversion server 130 may be configured with other mechanisms, processes and functionality, depending upon a particular implementation, and the approach described herein.

Network 110 may be implemented with any type of medium and/or mechanism that facilitates the exchange of information between client device 102, printing device 120, and conversion server 130. Furthermore, network 110 may use any type of communications protocol and may be secured or unsecured, depending upon the requirements of a particular application.

III. Printing without a Client Print Driver

Figure 2:
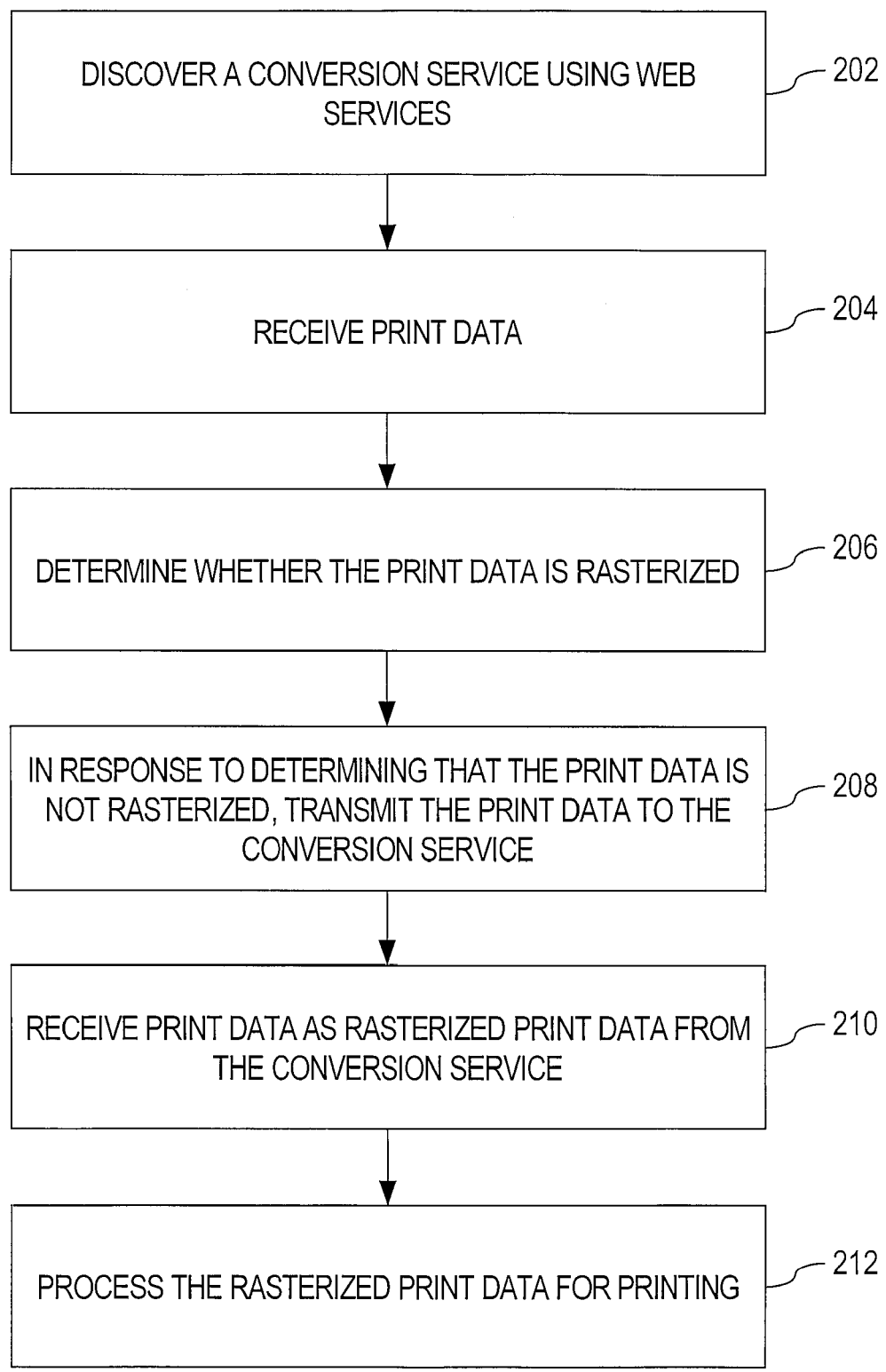
FIG. 2 illustrates an example method of processing print data for printing without a client print driver.

FIG. 2 illustrates an example method 200 of processing print data for printing without a client print driver. At step 202, a conversion service is discovered using Web services. For example, print agent 126 (FIG. 1) implements Web services, i.e., WS-Discovery described in more detail hereafter. Print agent 126 discovers conversion service 132 on conversion server 130 using Web services.

At step 204, print data is received. For example, a user at client device 102 uses application 104 to create an electronic document. Printing client 106 transmits print data representing the electronic document to printing device 120 for printing. Printing device 120 receives the print data at Web services-enabled print service 122.

At step 206, a determination is made whether the print data is rasterized. For example, Web services-enabled print service 122 determines whether the received print data is rasterized, as described in more detail below.

At step 208, the print data is transmitted to the conversion service in response to determining that the print data is not rasterized. For example, Web services-enabled print service 122 determines that the received print data is not rasterized. In response, Web services-enabled print service 122 transmits the print data to print agent 126. Print agent 126 determines that conversion service 132 on conversion server 130 is an appropriate conversion service to convert the print data to rasterized print data, and transfers the print data to conversion service 132.

At step 210, the print data is received as rasterized print data from the conversion service. For example, conversion service 132 converts the print data to rasterized print data and transmits the rasterized print data back to print agent 126. Print agent 126 returns the rasterized print data to Web services-enabled print service 122.

At step 212, the rasterized print data is processed for printing. For example, Web services-enabled print service 122 transfers the rasterized print data received from print agent 126 to print process 124. Print process 124 causes the electronic document reflected in the rasterized print data to be processed for printing.

IV. Web Services

In example network arrangement 100, at least printing client 106, Web services-enabled print service 122, print agent 126, and conversion service 132 implement Web services to interact with other devices and applications.

The World Wide Web Consortium (W3C), which is an international consortium that develops standards for the World Wide Web, defines a "Web service" as a software system that is designed to support interoperable machine-to-machine interaction over a network. This definition encompasses many different systems, but in common usage, the term refers to those services that use Simple Object Access Protocol (SOAP)-formatted Extensible Markup Language (XML) envelopes and that have their interfaces described using Web Services Description Language (WSDL). Web services allow devices and applications to communicate with each other over one or more networks without the intervention of any human being, while using the same suite of protocols (e.g., Hypertext Transfer Protocol (HTTP)) that a human being would use to communicate with such devices and applications over the one or more networks.

SOAP is an XML-based, extensible message envelope format, with bindings to underlying protocols (e.g., HTTP and Simple Mail Transfer Protocol (SMTP)). Using XML, SOAP defines how messages should be formatted, so that those messages are formatted in such a way that the recipients of those messages (devices and applications) can understand those messages. SOAP can be used to perform remote procedure calls, for example.

WSDL is an XML format that allows Web service interfaces to be described along with the details of those interfaces' bindings to specific protocols. WSDL is typically used to generate server and client code, and for configuration.

As such, common core specifications of Web services are SOAP, and WSDL, as well as WS-Discovery, WS-MetadataExchange, WS-Eventing, and WS-Addressing. Different specifications address different tasks and functions.

A. WSD Devices

Some devices that host one or more Web services also implement the Devices Profile for Web Services (DPWS) specification. DPWS defines a minimal set of implementation constraints to enable secure Web Service messaging, discovery, description, and eventing on devices. Devices that implement DPWS are referred to hereinafter as Web Services for Devices (WSD) devices. Non-limiting examples of WSD devices include scanners, printers, copiers, facsimile machines, archiving devices, and any combination of the above. In one embodiment of the invention, Web services-enabled print service 122 implements the core subset of Web services specifications required by DPWS. As such, in this embodiment of the invention, printing device 120 is a WSD device.

DPWS builds on the following core Web Services standards: WSDL 1.1, XML Schema, SOAP 1.2, WS-Addressing, and further comprises WS-MetadataExchange, WS-Transfer, WS-Policy, WS-Security, WS-Discovery, and WS-Eventing. The latest DPWS specification (published in February, 2006) is incorporated herein by reference as if fully disclosed herein.

While particular Web service protocols, such as WS-MetadataExchange, WS-Transfer, WS-Policy, WS-Security, WS-Discovery and WS-Eventing may be used to implement the embodiments of the invention, other protocols and message formats may also be used.

V. Using Web Services to Process Non-Rasterized Print Data from a Client

Users of client devices that implement printing without client print drivers may use Web services to search for accessible printing devices that support printing without a client print driver. Such client devices may implement a printing client that has the ability to interact directly with these printing devices to discover the options and capabilities of the devices. As such, users may have a choice of which available printing device to use based on the full range of options and capabilities of the printing devices.

Furthermore, printing devices supporting printing without a client print driver may search for conversion services using Web services. As such, a printing device may have access to one or more conversion services that convert various types of electronic documents to rasterized print data.

A. Discovering Conversion Services

Figure 3:
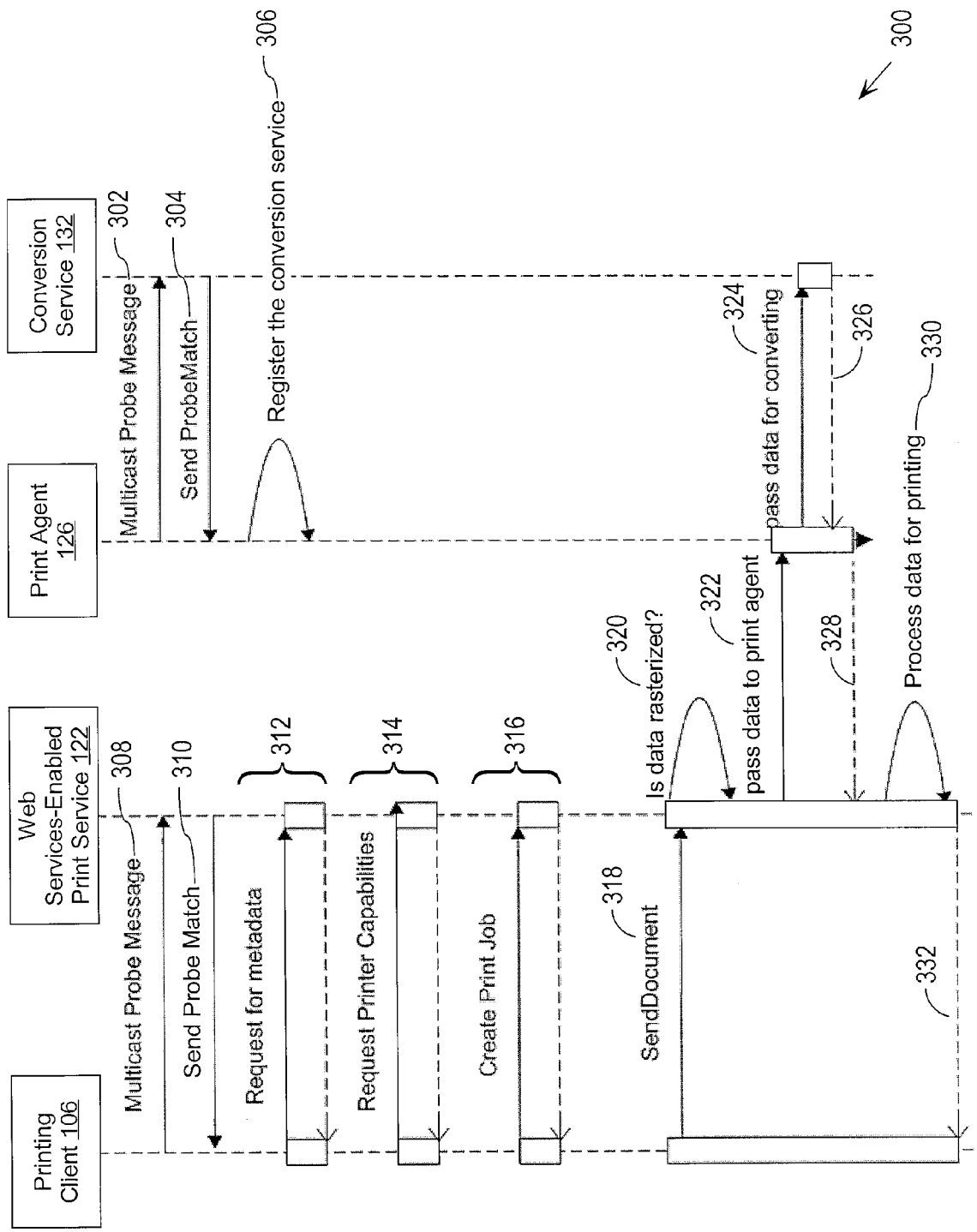
FIG. 3 illustrates an example method of using Web services to process print data without a client print driver.

FIG. 3 illustrates an example method 300 of using Web services to process print data without a client print driver. In one embodiment of the invention illustrated by example method 300, print agent 126 uses WS-Discovery to search for accessible conversion services. At step 302, conversion service 132 receives a multicast Probe message from print agent 126. For example, in the context of example network arrangement 100 of FIG. 1, print agent 126 sends a multicast Probe message over network 110. Print agent 126 may send the multicast Probe message when printing device 120 initializes, according to WS-Discovery protocol. The multicast Probe message indicates that print agent 126 seeks target services of a certain type, i.e., print data conversion services. Such a print data conversion service may be denoted in the message by a service type indicator such as "PrintConversion". Print agent 126 also includes, in the Probe message, any other aspects of the service sought by the print agent, such as the languages accepted by printing device 120. For example, the multicast Probe message may specify one or more print control languages, such as PCL5, PCL6, PostScript, etc., that printing device 120 accepts. Conversion service 132, available on conversion server 130, is accessible over network 110 and receives the multicast Probe message from print agent 126.

At step 304, conversion service 132 sends a Probe Match message to print agent 126 in response to the multicast Probe message. For example, conversion service 132 determines that conversion service 132 is a service of type "PrintConversion", and that conversion service 132 complies with all other aspects of the requested service, as indicated by the Probe message. In response to this determination, conversion service 132 sends a unicast Probe Match message to print agent 126 to indicate that conversion server 130 includes a service of the requested type, i.e., conversion service 132. Such a Probe Match message may include a source IP address for conversion service 132, including a port number at which conversion service 132 may be accessed, and one or more types of data that conversion service 132 converts to rasterized print data. For example, the Probe Match message sent by conversion service 132 may indicate to print agent 126 that conversion service 132 is at IP address "172.30.4.223", is accessible at port "1600", and converts non-rasterized plain text into rasterized print data.

Multiple conversion services may be available on conversion server 130, depending on the configuration of the server. Also, conversion services available on conversion servers other than conversion server 130 (not shown in FIG. 1) may be detected by print agent 126. Conversion services, such as conversion service 132, may support converting to rasterized print data one or more of vector images, raster images, word processing documents, spreadsheets, emails, plain text, html text, PDFs, etc.

In another embodiment of the invention, conversion server 130 includes a discovery service that responds to discovery requests. Such a discovery service includes a list of service types that are available on conversion server 130, and responds to Probe messages for services of these available types. In this embodiment, the discovery service on conversion server 130 sends the Probe Match message to print agent 126 in response to the multicast Probe message, and conversion service 132 does not send a Probe Match message. For purposes of explanation, individual services are described below as responding to appropriate Probe messages.

At step 306, print agent 126 registers conversion service 132. For example, print agent 126 may maintain a table of conversion services information. FIG. 4 illustrates an example table 400 of recorded conversion services information. Print agent 126 records, in table 400, a conversion type and an IP address and port number for each conversion service that is accessible to print agent 126. To illustrate, the information for conversion service 132 is recorded at row 402 in table 400. According to certain embodiments of the invention, a print agent may record information not illustrated in table 400, or may store the information shown in table 400 in varying formats. Furthermore, a print agent may register conversion services in many ways within the embodiments of the invention, such as recording the conversion service information in a configuration file, a SQL database, or an XML document, etc.

B. Discovering Printing Devices that Support Non-Print Driver Printing

In another embodiment of the invention, a client device uses Web services to discover Web services-enabled print services that support printing without a client print driver and that are accessible to the client device. This may be accomplished using the WS-Discovery protocol in a manner similar to the example process of discovering conversion services described above.

Specifically, at step 308, Web services-enabled print service 122 receives a multicast Probe message from printing client 106. For example, in the context of example network arrangement 100 of FIG. 1, printing client 106 at client device 102 sends a multicast Probe message over network 110, at the request of a user and according to the WS-Discovery protocol. The multicast Probe message indicates that printing client 106 seeks print services that support printing without a client print driver. To indicate this type of service, the Probe message may include a service type indicator such as "PrintNoDriver". Web services-enabled print service 122, available on printing device 120, is accessible over network 110 and receives the multicast Probe message from printing client 106.

At step 310, Web services-enabled print service 122 sends a Probe Match message to printing client 106 in response to the multicast Probe message. Web services-enabled print service 122 may determine whether it supports the type "PrintNoDriver" in many ways within certain embodiments of the invention.

In one embodiment of the invention, Web services-enabled print service 122 is configured to respond to requests for certain service types. Web services-enabled print service 122 may have access to a configuration file that includes a list of service types that Web services-enabled print service 122 supports, e.g., "PrintBasic", "PrintAdvanced", "PrintColor", etc, and the type "PrintNoDriver" is added to the configuration file during the installation of print agent 126 on printing device 120. Upon receipt of the Probe message, Web services-enabled print service 122 determines that it supports the type "PrintNoDriver" based on the configuration file.

In another embodiment of the invention, Web services-enabled print service 122 is configured to search for a print agent available on printing device 120 upon receipt of a Probe message seeking a "PrintNoDriver" type service. In this embodiment of the invention, if a print agent is found, then Web services-enabled print service 122 supports the requested service type.

Upon determining that Web services-enabled print service 122 supports a "PrintNoDriver" type service, Web services-enabled print service 122 sends a unicast Probe Match message to printing client 106. The Probe Match message indicates to printing client 106 that printing device 120 includes Web services-enabled print service 122, which is a service of the requested type. According to the WS-Discovery protocol, the Probe Match message includes the information necessary to access Web services-enabled print service 122.

At step 312, printing client 106 requests metadata from Web services-enabled print service 122. For example, printing client 106 requests metadata that describes printing device 120, such as device name, serial number, manufacturer, model name, model number, etc., as well as information about the services that are included on printing device 120, according to the DPWS specification. Such a request may conform to the WS-MetadataExchange protocol.

Further at step 312, Web services-enabled print service 122 responds to the request for metadata. For example, Web services-enabled print service 122 returns metadata including the information indicated in the DPWS specification to printing client 106.

At step 314, printing client 106 requests printer capabilities from Web services-enabled print service 122. For example, printing client 106 and Web services-enabled print service 122 may implement a common Web services printing protocol, which includes a GetPrinterCapabilities. Printing client 106 may invoke a GetPrinterCapabilities function, i.e., through SOAP.

Also at step 314, Web services-enabled print service 122 responds to the request for printer capabilities. For example, in response to the invocation of the getCapabilities function, Web services-enabled print service 122 returns to printing client 106 an XML structure defining the capabilities of printing device 120. In one embodiment of the invention, the capabilities of printing device 120 include a list of features supported by printing device 120 and the available options for each supported feature. Many different methods may be used to determine the capabilities of a particular printing device, including functions of different names returning a variety of formats of information.

C. Graphical User Interface

Figure 5:
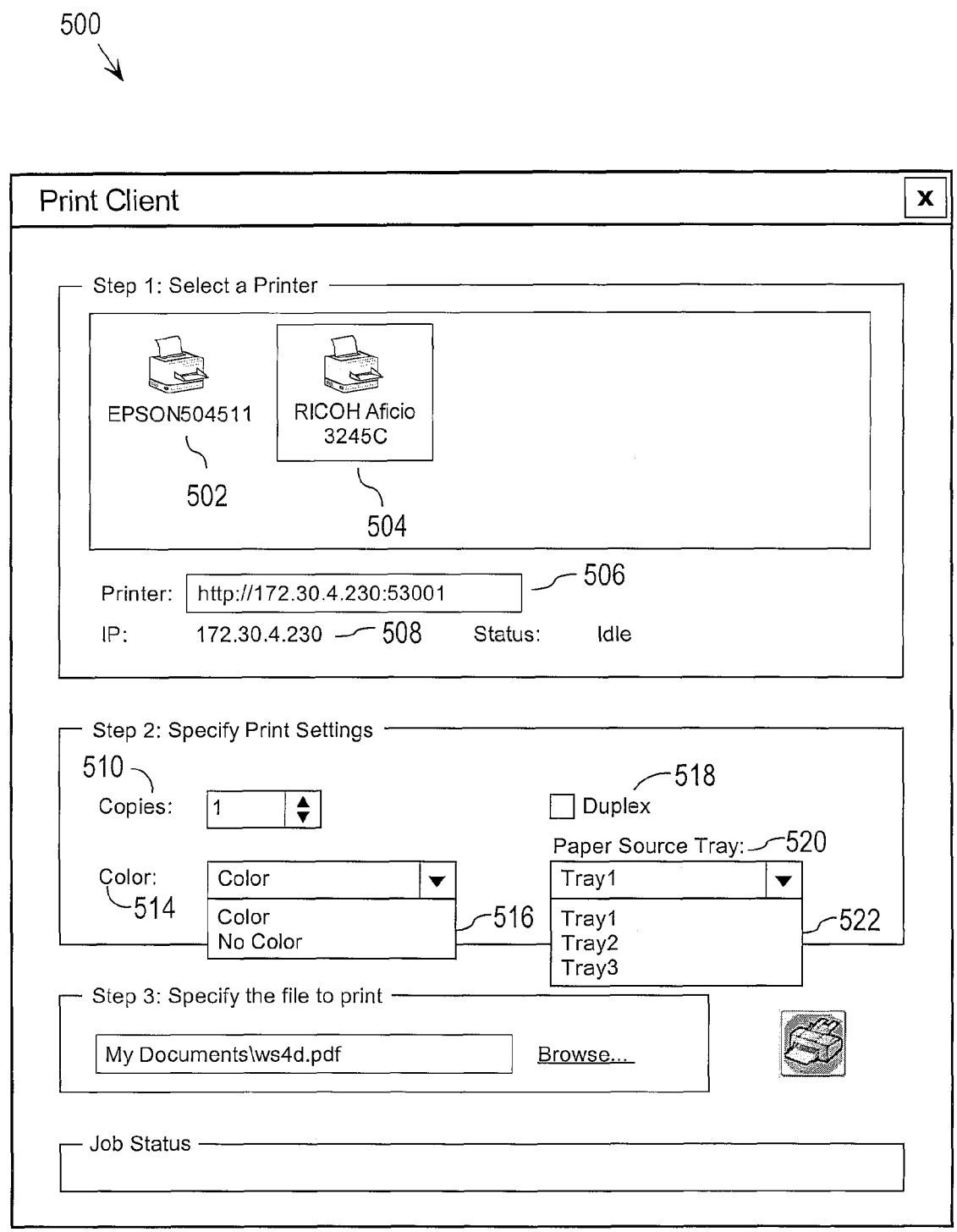
FIG. 5 illustrates an example graphical user interface produced by a printing client.

At step 316, printing client 106 requests that Web services-enabled print service 122 create a print job. Such a request for creation of a print job originates from a user. The request also includes options selected by the user for the particular print job. For example, a user of client device 102 creates an electronic document using application 104, and requests that the electronic document be processed for printing. To print the electronic document, application 104 contacts printing client 106, which produces a graphical user interface using the information gathered about the available printing devices. FIG. 5 illustrates an example GUI 500 that presents to a user a choice of printing devices for printing an electronic document and the options and corresponding features for a particular highlighted printing device, i.e., printer 504. Through GUI 500, the user may select a particular printing device and print options to use for printing the electronic document.

In example GUI 500, printer 504 is highlighted, and printer 502 is not highlighted. Thus, information about printer 504, which was received directly from printer 504 using Web services, is displayed in GUI 500. Such information may include URL 506, and IP address 508. Also, the displayed information may include features supported by the highlighted printer and options available for the features, i.e., a number of Copies 510, a Color feature 514 with the options 516 of Color and No Color, a binary Duplex feature 518, and a Paper Source Tray feature 520 with the options 522 of Tray1, Tray2, and Tray3. The features shown in GUI 500 are non-limiting examples of features that may be supported by a particular printing device and displayed to a user. A GUI produced by a printing client may represent features and options of a particular printing device in any manner within the embodiments of the invention. Furthermore, such a GUI may represent a subset of the features and/or options received from a particular printer.

D. Transferring Print Data and Options to a Printing Device

Once a particular printing device is chosen to process a particular electronic document for printing, and the options are selected for the print data, i.e., through GUI 500, information for printing the electronic document is sent to the printing device. Continuing with example method 300 at step 316, printing client 106 sends a Create Print Job message to Web services-enabled print service 122. The Create Print Job message includes the options and capabilities that are selected for the print data. Printing client 106 forwards the message to Web services-enabled print service 122. In one embodiment of the invention, printing client 106 indicates in the Create Print Job message, or in information accompanying the message, that the print data for the requested print job is non-rasterized print data.

Web services-enabled print service 122 receives the Create Print Job message and determines whether Web services-enabled print service 122 can support the features and options indicated in the accompanying information. If Web services-enabled print service 122 cannot support the indicated features and options, an error is returned to printing client 106. However, if Web services-enabled print service 122 can support the selected features and options, Web services-enabled print service 122 assigns the request a print job ID, and stores the requested options and capabilities, sometimes called a "ticket", in conjunction with the print job ID. Web services-enabled print service 122 then returns a message indicating a successful creation of a print job, which includes the print job ID, to printing client 106.

After receiving the print job ID, printing client 106 sends the non-rasterized print data representing the electronic document, along with the received print job ID, to Web services-enabled print service 122, at step 318. Printing client 106 may send this information in an XML message that has the print job ID in an XML tag and the non-rasterized print data as an attachment. Printing client 106 may also transmit the print job ID and print data to Web services-enabled print service 122 in many ways within the embodiments of the invention.

When Web services-enabled print service 122 receives the print data, the print service determines whether the data is rasterized at step 320. In one embodiment of the invention, Web services-enabled print service 122 examines the stored ticket that corresponds to the print job ID of the print data to determine whether printing client 106 indicated in the ticket or in the Create Print Job message that the print data for the print job ID would not be rasterized. In another embodiment of the invention, Web services-enabled print service 122 inspects the print data itself to determine whether the data is rasterized. Web services-enabled print service 122 may determine whether the print data is rasterized in many different ways within the embodiments of the invention.

If Web services-enabled print service 122 determines that the print data is rasterized, the print data is immediately processed for printing at step 330. However, if Web services-enabled print service 122 determines that the print data is not rasterized, then, at step 322, the print data is passed to print agent 126, along with the ticket indicating the printing options and features selected by the user for the print data. At step 324, the document is passed from print agent 126 to conversion service 132 for converting to rasterized print data.

E. Converting Non-Rasterized Print Data Using a Print Agent

Figure 6:
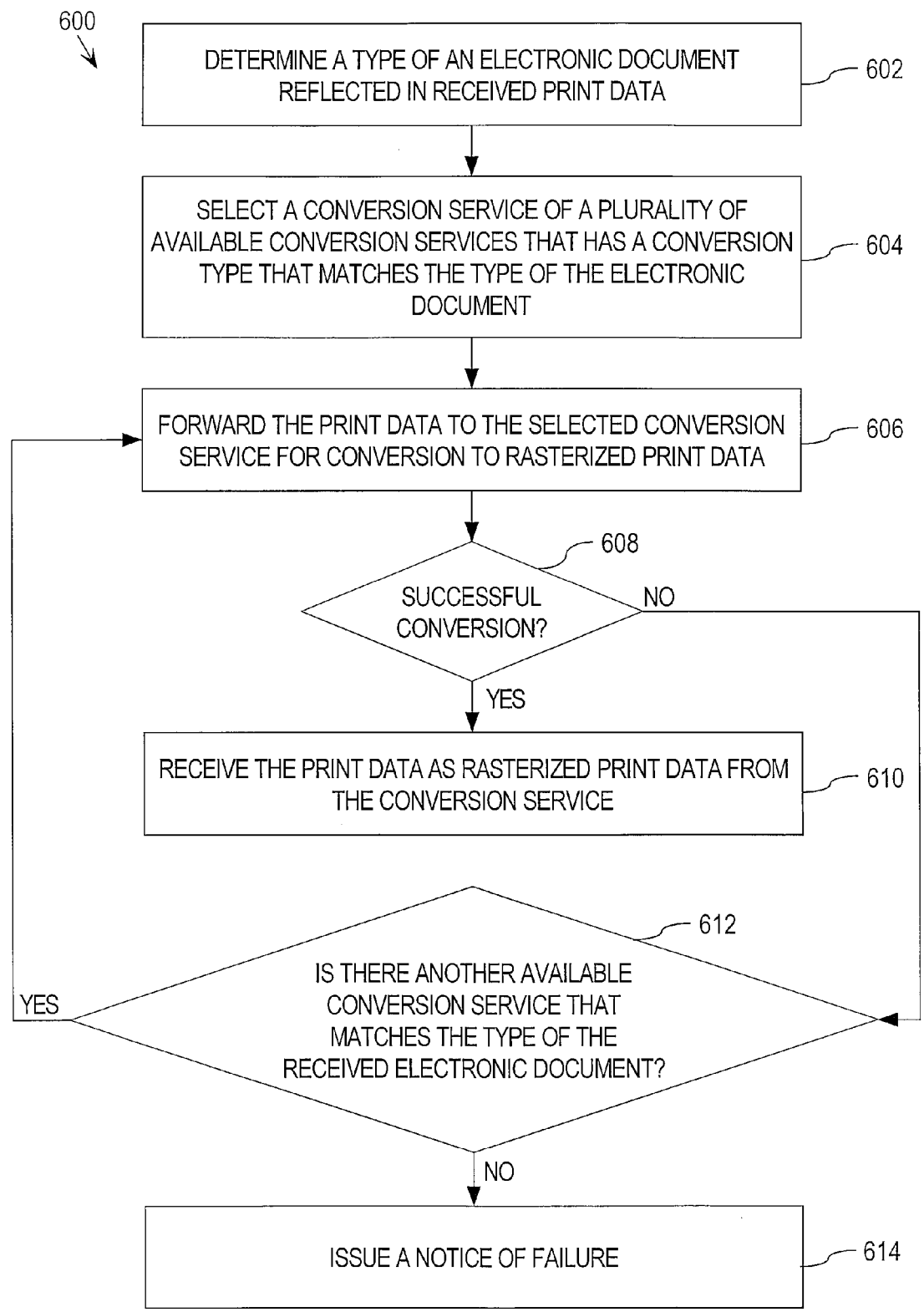
FIG. 6 illustrates an example process of converting non-rasterized print data to rasterized print data using a print agent at a printing device.

FIG. 6 illustrates an example process 600 of converting non-rasterized electronic print data to rasterized print data using a print agent at a printing device. Once a printing device receives non-rasterized print data, as illustrated by step 318 of FIG. 3, a print agent resident on the printing device may determine which of the conversion services registered at the print agent should be used to convert the non-rasterized print data to rasterized print data.

At step 602, a type of an electronic document reflected in received print data is determined. For example, referring to example network arrangement 100 of FIG. 1, print agent 126 determines a type of an electronic document reflected in print data received from Web services-enabled print service 122. For purposes of illustration, the electronic document is determined to be a plain text document. Electronic documents may be of any type within the embodiments of the invention, e.g., vector images, raster images, word processing documents, spreadsheets, emails, plain text, html text, PDFs, etc.

At step 604, a conversion service of a plurality of available conversion services that has a conversion type that matches the type of the electronic document is selected. For example, print agent 126 searches the conversion services registered in table 400 (FIG. 4) for a conversion service with a conversion type that matches the type of the received electronic document. In the example of table 400, conversion service 132 registered at row 402 has a conversion type of "text/plain", which matches the type of the received electronic document. Therefore, print agent 126 selects conversion service 132 to convert the received non-rasterized print data to rasterized print data.

A print agent may use any method of selecting an appropriate conversion service from a plurality of available conversion services within the embodiments of the invention. The following are non-limiting examples of such methods. For example, a print agent may select the first conversion service that has the appropriate conversion type in a list of conversion services. As another example, a print agent may record a number of times each conversion service has been selected for converting print data, and select an appropriate conversion service that has been used least. Furthermore, a print agent may determine which conversion service returns the least number of failure messages and select the most successful conversion service, with an appropriate conversion type, based on that metric. In yet another example, a print agent may poll the conversion services in the list for workload data, and select an appropriate conversion service that returns workload data indicating the least amount of workload of all of the conversion services in the list.

At step 606, the print data is forwarded to the selected conversion service for conversion to rasterized print data. For example, print agent 126 forwards the non-rasterized print data to the selected conversion service 132 for converting to rasterized print data. Conversion service 132 attempts to convert the transmitted print data to rasterized print data. This step is also illustrated by step 324 of example method 300 (FIG. 3).

At step 608, it is determined whether the conversion attempt by the conversion service was successful. Print agent 126 may determine whether a conversion attempt was successful in many ways within the embodiments of the invention. For example, conversion service 132 may return a success or failure message to print agent 126 to communicate the outcome of the conversion attempt. As a further example, print agent 126 may implement a timer. If conversion service 132 returns the print data in rasterized form to print agent 126 before the timer expires, then the conversion attempt is successful. If the timer expires without conversion service 132 forwarding converted data, the conversion attempt is considered to be failed.

If the conversion attempt is successful at step 608, then at step 610 the print data is received as rasterized print data. For example, print agent 126 receives the converted print data, now rasterized print data, from conversion service 132. This step is also illustrated at step 326 of FIG. 3.

In one embodiment of the invention, if the conversion attempt was not successful at step 608, then at step 612 it is determined whether there is another available conversion service that matches the type of the received electronic document. For example, print agent 126 determines that conversion service 132 has failed. Print agent 126 then searches the registration of conversion services, i.e., table 400 of FIG. 4, to determine if a conversion service other than conversion service 132 matches the type of the received electronic document.

If there is another conversion service that matches the type of the received document at step 612, then, at step 606, the print data is forwarded to the second selected conversion service. For example, print agent 126 determines that the conversion service registered at row 410 of table 400 also converts plain text documents to rasterized print data. The non-rasterized print data is forwarded to the conversion service corresponding to row 410 upon the failure of conversion service 132.

If there is not another conversion service that matches the type of the received document at step 612, then, at step 614, a notice of failure is issued. For example, print agent 126 determines that none of the conversion services registered in table 400 can successfully convert the non-rasterized print data to rasterized print data. As such, print agent 126 returns a failure notice to Web services-enabled print service 122.

The print agent may deal with the failure of a conversion service in many ways within the embodiments of the invention. For example, the print agent may determine a cause of the failure and take steps to fix the cause. As a further example, the print agent may simply return the failure notice received from a single conversion attempt without determining if another conversion service is capable and able to convert the print data.

Returning to example method 300 of FIG. 3, at step 326, conversion service 132 returns a response to print agent 126, which includes either the rasterized print data, or a failure message. At step 328, print agent 126 forwards the rasterized print data or the failure message to Web services-enabled print service 122.

If Web services-enabled print service 122 receives rasterized data at step 328, then Web services-enabled print service 122 associates the rasterized print data with the print job ID and the ticket associated with the electronic document represented by the print data. For example, the rasterized print data may have the corresponding print job ID embedded in the print data. As a further non-limiting example, the rasterized print data may be returned from a synchronous call to print agent 126. At step 330, Web services-enabled print service 122 processes the rasterized print data for printing. Then, at step 332, an appropriate success or failure message is returned to printing client 106.

In one embodiment of the invention, Web services-enabled print service 122 and print agent 126 are implemented using one module. In another embodiment of the invention, print agent 126 may be implemented as a plug-in to Web services-enabled print service 122. In yet another embodiment of the invention, the functionality described as associated with Web services-enabled print service 122 and print agent 126 may be implemented by two or more modules that are resident on printing device 120 or that are remote to printing device 120.

In yet another embodiment of the invention, information may be transmitted over network 110 using a secure protocol, such as secure HTTP (HTTPS). Thus, according to this embodiment, client device 102, printing device 120, and conversion server 130 interact using HTTPS.

VI. Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
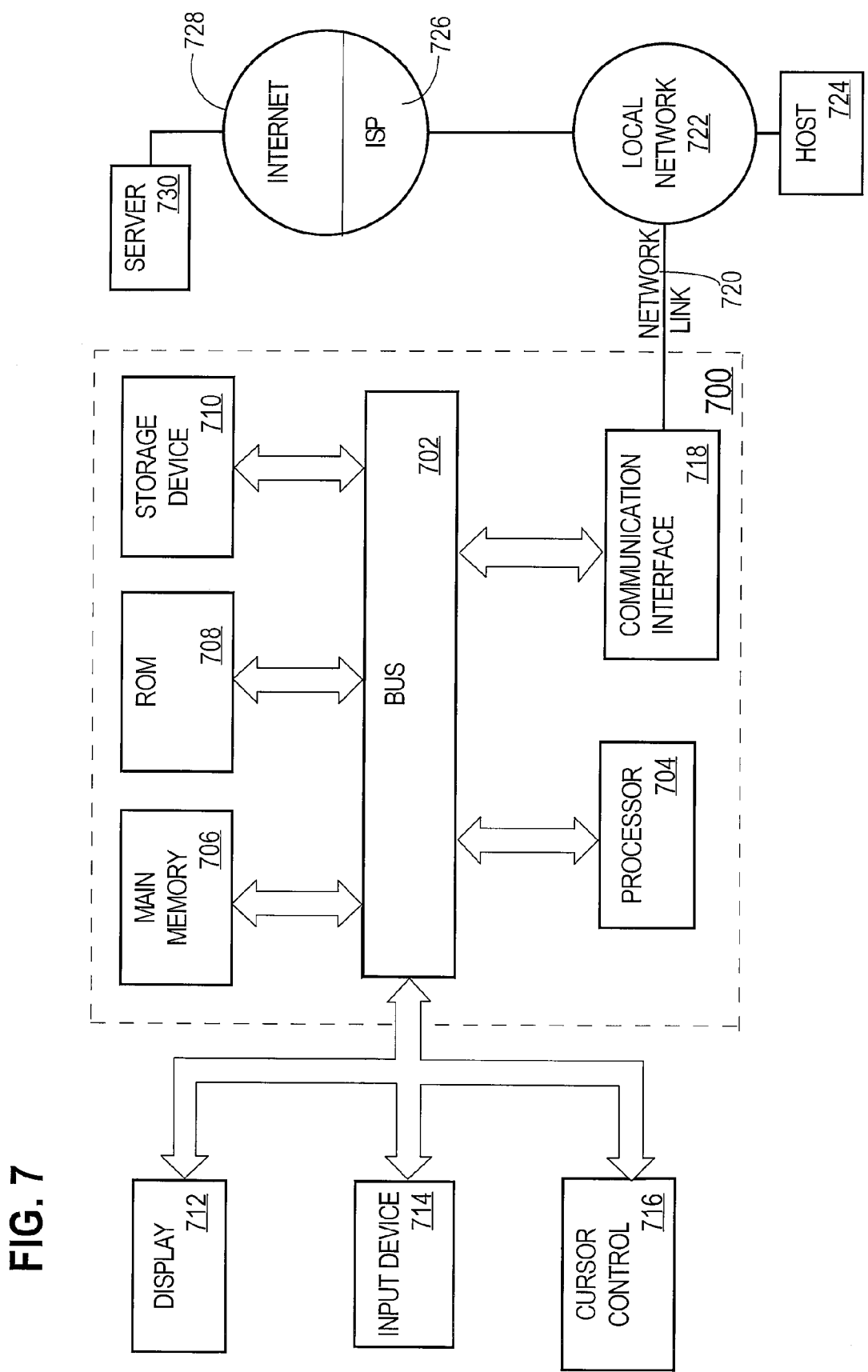
FIG. 7 is a block diagram of a computer system on which embodiments of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A printing device comprising:
   a web services-enabled print service configured to:
      receive print data from a client,
      determine whether the print data is rasterized,
      in response to determining that the print data is not rasterized, transmit the print data to a print agent at the printing device,
      receive the print data as rasterized print data from the print agent, and
      process the rasterized print data for printing; and
   the print agent configured to:
      discover a particular conversion service using web services,
      receive the print data from the web services-enabled print service, wherein the print data is not rasterized,
      transmit the print data to the particular conversion service,
      receive the print data as rasterized print data from the particular conversion service, and
      transmit the rasterized print data to the web services-enabled print service.

2. The printing device of claim 1,
   wherein the particular conversion service is maintained at a device accessible to the printing device over a network; and
   wherein the print agent is further configured to discover the particular conversion service over the network.

3. The printing device of claim 1, wherein determining that the print data is not rasterized further comprises receiving, from the client, notification that the print data is not rasterized.

4. The printing device of claim 1, wherein the print agent is further configured to:
   discover a plurality of conversion services, including the particular conversion service;
   determine a conversion type for each of the plurality of conversion services;
   wherein a type of an electronic document reflected in the print data matches the conversion type of the particular conversion service.

5. The printing device of claim 4, wherein the print agent is further configured to maintain a table that includes an address of each of the plurality of conversion services, and the conversion type for each of the plurality of conversion services.

6. The printing device of claim 1,
   wherein the web services-enabled print service is further configured to: receive, from the client, print options and features selected for the print data, and transmit the print options and features to the print agent with the print data; and
   wherein the print agent is further configured to:
      receive the print options and features from the web services-enabled print service, and
      transmit the print options and features to the particular conversion service with the print data.

7. The printing device of claim 1,
   wherein the particular conversion service is configured to respond to a discovery request from the print agent; and wherein the web services-enabled print service is further configured to respond to discovery requests, from clients, that indicate that a non-print driver printing device should respond.

8. A computer-implemented method comprising:
discovering a particular conversion service using web services;
receiving print data at a printing device;
determining whether the print data is rasterized;
in response to determining that the print data is not rasterized, transmitting the print data to the particular conversion service;
receiving the print data as rasterized print data from the particular conversion service;
processing the rasterized print data for printing.

9. A non-transitory computer-readable medium storing carrying instructions which, when processed by one or more processors, cause:
a web services-enabled print service executing on a printing device and:
receiving print data from a client,
determining whether the print data is rasterized,
in response to determining that the print data is not rasterized, transmitting the print data to a print agent at the printing device,
receiving the print data as rasterized print data from the print agent, and
processing the rasterized print data for printing; and
the print agent executing on the printing device and:
discovering a particular conversion service using web services,
receiving the print data from the web services-enabled print service, wherein the print data is not rasterized,
transmitting the print data to the particular conversion service,
receiving the print data as rasterized print data from the particular conversion service, and
transmitting the rasterized print data to the web services-enabled print service.

10. The non-transitory computer-readable medium of claim 9,
wherein the particular conversion service is maintained at a device accessible to the printing device over a network; and
wherein the print agent discovering the particular conversion service further comprises discovering the particular conversion service over the network.

11. The non-transitory computer-readable medium of claim 9, wherein determining that the print data is not rasterized further comprises receiving, from the client, notification that the print data is not rasterized.

12. The non-transitory computer-readable medium of claim 9, wherein the instructions further comprise instructions which, when processed by the one or more processors, cause the print agent to:
discover a plurality of conversion services, including the particular conversion service;
determine a conversion type for each of the plurality of conversion services;
wherein a type of an electronic document reflected in the print data matches the conversion type of the particular conversion service.

13. The non-transitory computer-readable medium of claim 12, wherein the instructions further comprise instructions which, when processed by the one or more processors, cause the print agent to maintain a table that includes an address of each of the plurality of conversion services, and the conversion type for each of the plurality of conversion services.

14. The non-transitory computer-readable medium of claim 9, wherein the instructions further comprise instructions which, when processed by the one or more processors, cause:
the web services-enabled print service to:
receive, from the client, print options and features selected for the print data, and transmit the print options and features to the print agent with the print data; and
the print agent to:
receive the print options and features from the web services-enabled print service, and
transmit the print options and features to the particular conversion service with the print data.

15. The non-transitory computer-readable medium of claim 9, wherein the instructions further comprise instructions which, when processed by the one or more processors, cause:
wherein the particular conversion service is configured to respond to a discovery request from the print agent;
the web services-enabled print service to respond to discovery requests, from clients, that indicate that a non-print driver printing device should respond.

16. The computer-implemented method of claim 8,
wherein the particular conversion service is maintained at a device accessible to the printing device over a network; and
wherein the print agent is further configured to discover the particular conversion service over the network.

17. The computer-implemented method of claim 8, wherein determining that the print data is not rasterized further comprises receiving, from the client, notification that the print data is not rasterized.

18. The computer-implemented method of claim 8, further comprising:
discovering a plurality of conversion services, including the particular conversion service;
determining a conversion type for each of the plurality of conversion services;
wherein a type of an electronic document reflected in the print data matches the conversion type of the particular conversion service.

19. The computer-implemented method of claim 18, further comprising maintaining a table that includes an address of each of the plurality of conversion services, and the conversion type for each of the plurality of conversion services.

20. The computer-implemented method of claim 8, further comprising:
receiving print options and features selected for the print data; and
transmitting the print options and features to the particular conversion service with the print data.

* * * * *

UNITED STATES PATENT AND TRADEMARK OFFICE
CERTIFICATE OF CORRECTION

PATENT NO.         : 8,289,551 B2
APPLICATION NO.    : 12/534749
DATED              : October 16, 2012
INVENTOR(S)        : Yuwen Wu Page 1 of 1

It is certified that error appears in the above-identified patent and that said Letters Patent is hereby corrected as shown below:

In the claims:

COLUMN 17

Claim 9 line 18 delete "carrying" between storing and instructions

COLUMN 18

Claim 15 line 30 insert --and-- after "the print agent;"

Signed and Sealed this
First Day of January, 2013

David J. Kappos
*Director of the United States Patent and Trademark Office*